United States Patent

[11] 3,608,678

| [72] | Inventor | Toyoaki Kobayashi<br>Toyohashi, Japan |
|---|---|---|
| [21] | Appl. No. | 863,302 |
| [22] | Filed | Oct. 2, 1969 |
| [45] | Patented | Sept. 28, 1971 |
| [73] | Assignee | Aisin Seiki Kabushiki Kaisha<br>Kariya City, Japan |

[54] SPOT-TYPE DISC BRAKE
6 Claims, 4 Drawing Figs.
[52] U.S. Cl. ................................................. 188/72.6,
188/73.4, 188/106 F, 188/345
[51] Int. Cl. ............................................... F16d 55/228
[50] Field of Search ........................................ 188/72.6,
72.9, 106 F, 73.4, 152.873, 72.5, 345, 106 P

[56] References Cited
UNITED STATES PATENTS
3,372,778   3/1968   Hambling .................... 188/106 F X Primary Examiner—George E. A. Halvosa
Attorney—Pierce, Scheffler & Parker ABSTRACT: A spot-type disc brake having a dual circuit from a master cylinder wherein four pistons are provided in a single hydraulic cylinder located on a stationary member so as to constitute two independent hydraulic chambers to which pressurized fluid is applied through each fluid passage for braking, and one of the pistons is adapted to be actuated mechanically by a hand-lever for parking.

PATENTED SEP 28 1971

3,608,678

INVENTOR.
Toyoaki Kobayashi
BY
Pierce, Scheffler & Parker
Attorneys

INVENTOR.
Toyoaki Kobayashi
BY
Pierce, Schiffler & Parker
Attorneys

SPOT-TYPE DISC BRAKE

SUMMARY OF THE INVENTION

This invention relates to improvements in disc brakes of the so-called spot type having a dual hydraulic fluid line from a master cylinder for use on automotive vehicles, more particularly the invention concerns disc brakes of the kind in which a hydraulic-pressure-operated cylinder is positioned on only one side of a brake disc, and braking is accomplished by causing a movable member straddling the brake disc to move in the axial direction of the brake disc.

An object of this invention is to provide new and improved spot-type disc brakes in which in the event of failure of one of the master cylinder lines, the pressure in the other line continues to act on one of the chambers.

Another object of this invention is to provide new and improved spot-type disc brakes which incorporate means for applying the brake mechanically from a hand lever for parking or emergency braking.

Further object of this invention is to provide new and improved spot-type disc brakes which take up little space and which effect considerable economies in manufacture.

These objects are achieved by the spot-type disc brake in which a hydraulic cylinder located on a stationary member and only at one side of the brake disc contains two independent hydraulic chambers connected to the respective pressure medium circuits of the master cylinder, the outer end of one of pistons which constitute the hydraulic chambers in the cylinder is engaged with bellcrank levers for applying the brake mechanically from a handbrake lever. The bellcrank levers are pivotally mounted on a movable member which is held by one friction pad assembly and another piston, and is movable relative to the stationary member in a direction parallel to the axis of the brake disc.

With the above and other objects in view, in detail, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

DETAILED DESCRIPTION

Figure 1:
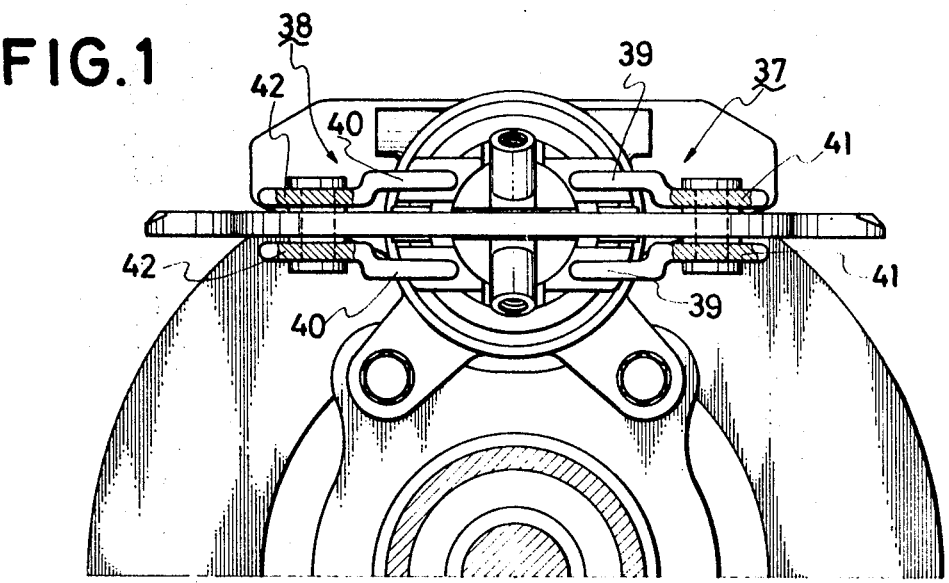
FIG. 1 is a side elevational view, in the direction of a brake disc axis of a disc brake embodying the present invention.
Figure 2:
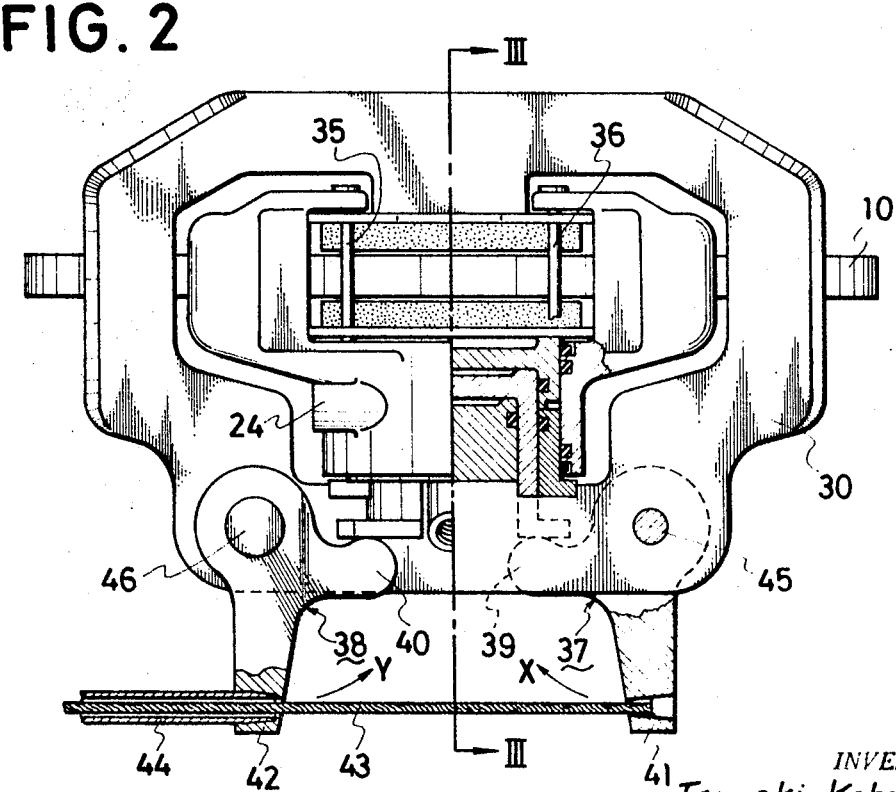
FIG. 2 is a partially sectioned plan view of the disc brake shown in FIG. 1.
Figure 3:
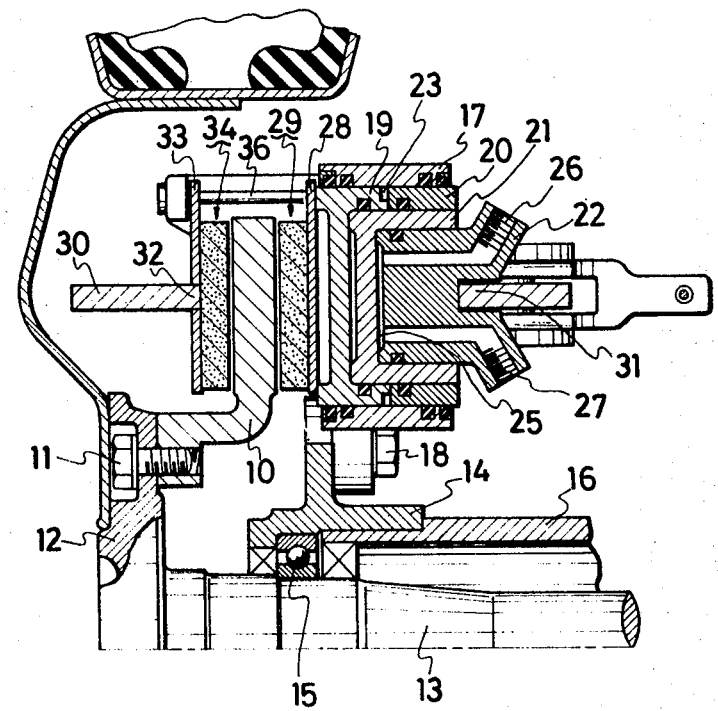
FIG. 3 is an elevational view, in vertical section taken along the line III—III of FIG. 2 as viewed in the arrow direction.

Referring to FIGS. 1, 2 and 3, a rotatable disc 10 is fixed by securing means such as bolts 11 to a hub 12 of a vehicle axle 13. A stationary member 14 nonrotatably mounted by bearing 15 on the axle shaft 13 is rigidly connected to another stationary member 16 which is extended from such a nonrotatable part of the vehicle as a differential gearbox (not shown). A cylinder body 17 located on one side of the rotatable brake disc 10 and having open ends at both ends thereof is securely mounted on the stationary member 14 by fixing bolts 18. An axis of a cylinder bore formed in the cylinder body 17 is at right angles to the plane of the disc.

Figure 4:
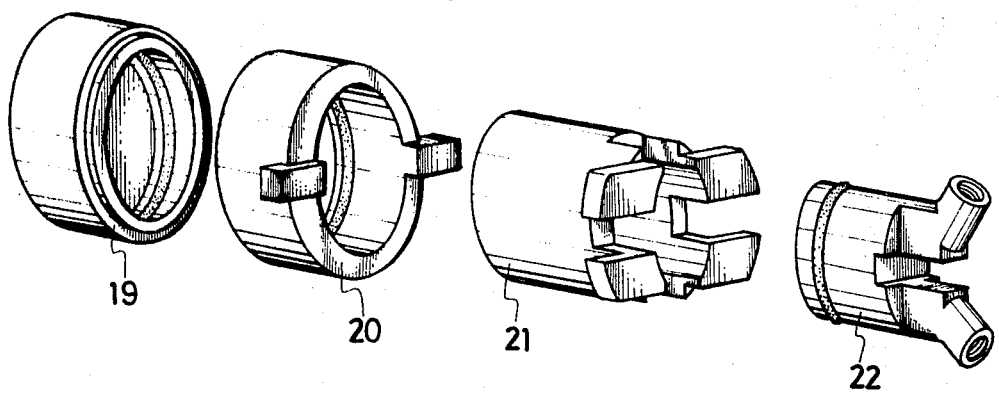
FIG. 4 is a perspective view of pistons according to the invention and arranged in the assembled order

In the cylinder body, there are provided first and second pistons 19, 20 in sealing engagement therewith, which are slidable in opposite directions to each other and have equal inside diameters and equal outside diameters. A third piston 21 is slidably and sealingly mounted in the inner walls of the pistons 19, 20. The head of the third piston 21 is normally attached to the inner wall of the first piston 19. An annular chamber 23 having an inlet port 24 and an outlet port (not shown) is constituted by the three pistons 19, 20 and 21 in the cylinder bore. A fourth piston 22 is slidably and sealingly mounted in the interior of the third piston 21 and arranged coaxially thereto. A cylindrical chamber 25 having an inlet port 26 and an outlet port 27 is constituted by the third and fourth pistons 21, 22. The arrangement of the four pistons 19–22 is clearly shown in FIG. 4.

The first piston 19 engages with a backing plate 28 of one friction pad assembly 29 adjacent to one friction facing of the brake disc 10 while the second and fourth pistons 20, 22 engage with one inner edge 31 of a movable member 30 of yoke or closed frame shape which straddles a portion of the periphery of the disc 10. The other inner edge 32 of the movable member 30 is engaged with a backing plate 33 of the other friction pad assembly 34 adjacent to the other frictional facing of the disc 10. A pair of friction pad assemblies 29, 34 are supported and guided to move toward the disc 10 by a pair of pins 35, 36 which suspend the backing plates 28, 33.

Coupled bellcrank levers 37, 38 are pivotally mounted on the movable member 30 by pivot pins 45, 46, respectively, on opposite sides of the axis of the cylinder bore. One-arm portions 39, 40 of the levers 37, 38 are engaged with the outer end of the third piston 21 whilst the other arm portion 41 of one bellcrank lever 37 is engaged with a wire 43 connected to a handbrake lever (not shown) and the other arm portion 42 of the other bellcrank lever 38 is engaged with a pipe 44 in which the wire 43 is supported. The bellcrank levers 37, 38 are rotatable in the clockwise and counterclockwise directions as shown by curved arrows X, Y of FIG. 2, respectively, by means of the wire 43 and the pipe 44.

The disc brake of above-described organization according to the invention operates in the following manner. When a brake pedal (not shown) is depressed to cause braking, hydraulic fluid under pressure from a master cylinder (also not shown) is supplied to the annular chamber 23 through the inlet port 24 and to the cylindrical chamber 25 through the other inlet port 26, respectively, at the same time. The hydraulic fluid supplied to the annular chamber 23 imports forces to the first and second pistons 19, 20 in opposite directions, whereby the first piston 19 directly presses one friction pad assembly 29 against the brake disc 10 (toward the left as viewed in FIG. 3), while the second piston 20 simultaneously presses the movable member 30 engaged therewith toward the right as viewed in FIG. 3 thereby to press the other friction pad assembly 34 against the brake disc. Simultaneously, the hydraulic fluid supplied to the cylindrical chamber 25 imparts forces to the third and fourth pistons 21, 22 in opposite directions, whereby the third piston 21 directly presses the first piston 19 toward the left as viewed in FIG. 3 while the fourth piston 22 presses the movable member 30 engaged therewith, thereby to press the other friction pad assembly 34 with the second piston 20. Thus, the brake disc 10 is squeezed by the friction pad assemblies 29, 34 and is thereby braked.

In the event of a failure of one of the brake lines connected to the ports 24 or 26, the pressure in the other line continues to act on one of the pistons. The brake does not fail completely but is applied with only a proportion of the braking force available in normal conditions.

When the hand lever is operated for parking or emergency braking, the bellcrank levers 37, 38 are moved around the pins 45, 46 in the directions indicated by X and Y in FIG. 2, respectively, thereby to cause one-arm portions 39, 40 of the crank levers 37, 38 to press through the third piston 21 the first piston 19 which is moved axially to press the directly actuated friction pad assembly 29 to the brake disc 10, the other friction pad assembly 34 being applied through the movable member 30 by the reaction on the pivot pins 45, 46 of the coupled bellcrank levers 37, 38.

Thus, it will be seen that when hydraulic fluid is introduced separately into the first and second fluid chambers to force the first and second pistons apart and to force the third and fourth pistons apart in opposite directions, said first piston will actuate the second friction pad against said brake disc and the means at the outer end of said second piston and the outer end of said fourth piston will actuate said movable yoke member to actuate the first friction pad against said brake disc, and that, upon failure of the fluid to one of the fluid chambers, the service braking device may be operated to actuate said friction pads to supplement the force lost by the failure of the fluid to said one of the fluid chambers.

I claim:

1. A spot-type disc brake comprising, in combination, a rotatable brake disc,
   a pair of friction pad assemblies disposed on opposite sides of said brake disc,
   a movable yoke member for directly actuating a first friction pad,
   an open-ended hydraulic cylinder stationarily mounted on one side of said brake disc,
   a first piston slidably mounted in said cylinder and having an inner end wall acting directly on the second friction pad,
   a second annular piston slidably mounted in said cylinder and provided with means at its outer end for mechanically actuating said movable yoke member,
   a third piston slidably mounted in said first and second pistons and having an inner end wall engaging the inner side of the end wall of said first piston, said first, second and third pistons providing a first fluid chamber between said first and second pistons, said third piston also provided with means at its outer end for being mechanically actuated,
   a fourth piston slidably mounted in said third piston and normally engaging the inside of the inner end wall of said third piston, said third and fourth pistons providing a second fluid chamber, the outer end of said fourth piston engaging said movable yoke member,
   a service braking device mounted on said movable yoke member and having means for actuating said third piston, whereby when hydraulic fluid is introduced separately into the first and second fluid chambers to force the first and second pistons apart and to force the third and fourth pistons apart in opposite directions, said first piston will actuate the second friction pad against said brake disc and the means at the outer end of said second piston and the outer end of said fourth piston will actuate said movable yoke member to actuate the first friction pad against said brake disc, and whereby, upon failure of the fluid to one of the fluid chambers, the service braking device may be operated to actuate said friction pads to supplement the force lost by the failure of the fluid to said one of the fluid chambers.

2. A spot-type disc brake as claimed in claim 1 wherein said fourth piston includes an inlet port through which fluid under pressure is supplied to said second fluid chamber and an outlet port through which any air within said second fluid chamber is expelled.

3. A spot-type disc brake as claimed in claim 1 wherein the means at the outer end of said second piston comprises a pair of projections disposed on each side of the main axis thereof for engagement with said movable member.

4. A spot-type disc brake as claimed in claim 1 wherein said service braking device comprises bellcrank lever means pivotally mounted on said movable member.

5. A spot-type disc brake as claimed in claim 4 wherein said bellcrank lever means comprises a pair of coupled bellcrank levers disposed at each side of the main axis of said hydraulic cylinder.

6. A spot-type disc brake as claimed in claim 5 wherein the means at the outer end of said third piston comprises two pairs of projections disposed at each side of the main axis thereof for engagement with said coupled bellcrank levers.